United States Patent [19]
Kigasawa et al.

[11] 3,728,347
[45] Apr. 17, 1973

[54] AZAMORPHINAN COMPOUNDS

[75] Inventors: Kazuo Kigasawa, Kawasaki; Mineharu Hiiragi; Nagatoshi Wagatsuma, both of Tokyo, all of Japan

[73] Assignee: Tokeda Chemical Industries, Ltd., Osaka, Japan

[22] Filed: Apr. 3, 1970

[21] Appl. No.: 25,530

[30] Foreign Application Priority Data

Apr. 3, 1969 Japan..................................44/25204

[52] U.S. Cl.................................260/250 A, 424/250
[51] Int. Cl.................................................C07d 51/04
[58] Field of Search....................................260/250 A

[56] References Cited

UNITED STATES PATENTS 3,300,500   1/1967   Sawa et al. ...........................260/285
3,332,950   7/1967   Blumberg et al. ...................260/285

OTHER PUBLICATIONS

Kametani et al., Chem. Pharm. Bull. Vol. 16(2) 296–303 (1968).

Primary Examiner—Nicholas S. Rizzo
Attorney—Wenderoth, Lind & Ponack

[57] ABSTRACT

Azamorphinan compounds of the formula

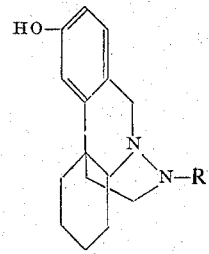

wherein R is an aralkyl group, a lower alkenyl group or a lower cycloalkylalkyl group, and pharmaceutically acceptable salts thereof, have useful analgesic activity and do not invite drug dependence.

8 Claims, 1 Drawing Figure

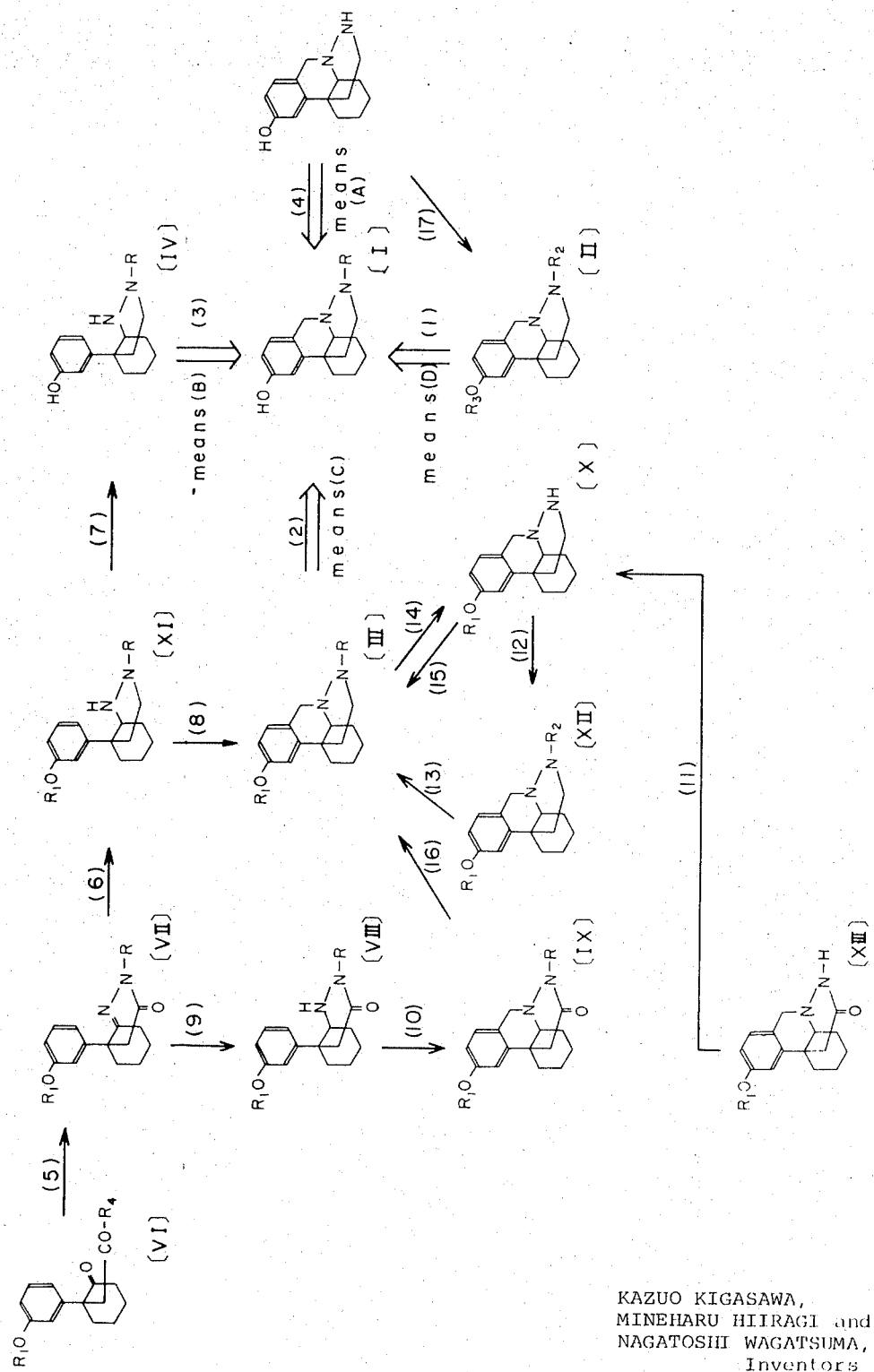

AZAMORPHINAN COMPOUNDS

The present invention relates to azamorphinan compounds shown by the general formula (I):

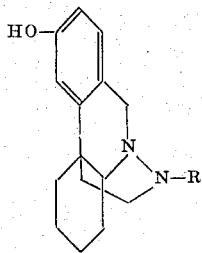

wherein R represents an aralkyl group, a lower alkenyl group or a lower cycloalkylalkyl group, and pharmaceutically acceptable salt thereof.

Said compounds are all novel compounds, and have been found by the present inventors to generally have a remarkable analgesic activity as strong as morphine has. Furthermore, due to an unexpected fact that the application of said compounds does not invite drug dependence, they are of great therapeutical value.

Therefore, it is the main object of the present invention to provide novel compounds of formula (I) which are useful, for example, as potent analgesics not inviting drug dependence.

These objects are realized by any of the following means (A) to (D):

A. reacting 3-hydroxy-9-azamorphinan with a compound shown by the general formula (V):

$$R X \quad (V)$$

(wherein R has the same meaning as defined above, and X is an acid residue). B. subjecting a decahydrocinnoline compound shown by the general formula (IV):

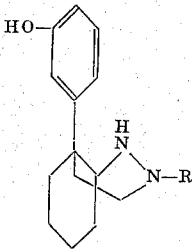

(wherein R has the same meaning as defined above) to a ring-closure condensation with formaldehyde or its derivative, C. allowing a 3-oxygenated-9-azamorphinan shown by the general formula (III):

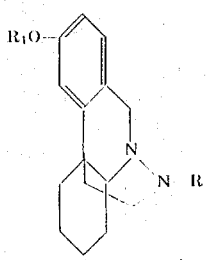

(wherein R has the same meaning as defined above, and $R_1$ is a lower alkyl group or an aralkyl group) to react with a mineral acid or its tertiary amine salt, or alternatively subjecting said 3-oxygenated-9-azamorphinan to reduction, and D. reduction of an N-acyl-9-azamorphinan shown by the general formula (II):

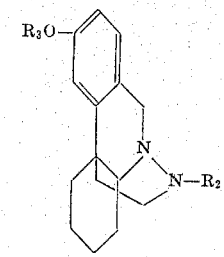

wherein $R_2$ is a carboxylic acyl group corresponding to the above mentioned R, and $R_3$ is hydrogen or a carboxylic acyl.

The reactions for the production of novel starting materials as well as desired products are shown by the attached schema.

In this schema, each of R, $R_1$, $R_2$ and $R_3$ has the same meaning as defined above, and $R_4$ is hydroxy, a lower alkyl group or a halogen atom.

The lower alkenyl group represented by R is exemplified by vinyl, 2,2-dimethylvinyl, 1-propenyl, allyl, 3,3-dimethylallyl, 1-pentenyl, 2-pentenyl or the like.

The lower alkyl group represented by $R_4$ and $R_1$ is exemplified by methyl, ethyl or propyl or the like.

The lower cycloalkylalkyl group represented by R is exemplified by cyclopropylmethyl, cyclobutylmethyl, cyclopentylmethyl, cyclohexylmethyl, cyclopropylethyl, cyclohexylethyl, cyclopentylpropyl, or the like.

The aralkyl group represented by R is exemplified by benzyl, phenethyl, 3-phenylpropyl or the like.

The carboxylic acyl group $R_2$, corresponding to R is exemplified by benzoyl, phenacetyl, cyclopropylcarbonyl, 3,3-dimethyl acryloyl or the like. The carboxylic acid group represented by $R_3$ includes $R_2$ and lower alkyl carbonyl group such as acetyl, propionyl or the like.

More particularly the Step (1) i.e. Means (D) is effected by reducing the N-acyl-9-azamorphinan (II) with a reducing agent to give the corresponding 9-azamorphinan compound (I). For this purpose, metal hydride complexes such as lithium aluminum hydride are suitably employed as the reducing agent. This reaction is usually conducted in a solvent and suitable are the etheral ones such as ether, tetrahydrofuran, dioxane, etc. The reaction temperature is suitably about 20° to 100°C and the reaction time is, in most cases, sufficient with about 1 to 48 hours.

Step (2) i.e. Means (C) is conducted by treating a 3-oxygenated-9-azamorphinan of the general formula (III), namely e.g. a 3-(lower alkoxy)-9-azamorphinan or a 3-aralkyloxy-9-azamorphinan, with a mineral acid or its tertiary amine salt. The mineral acid to be used therefor is for example hydroiodic acid, hydrobromic acid, hydrochloric acid, phosphoric acid or the like, and the salts thereof include, for example, ones of the acid with an tertiary amine such as pyridine, dimethylaniline, triethylamine, trimethylamine, triethanolamine, or the like. This reaction does not necessarily require the use of a solvent, but may be smoothly conducted in a suitable solvent. The solvent for this purpose is exemplified by a lower alcohol (e.g. methanol, ethanol, propanol, etc.), acetic acid, or their mixture with water. Although the reaction proceeds so far as the mineral acid or its amine salt coexists, it is preferable to employ the mineral acid or its tertiary amine salt in an amount not less than 3 moles per mole of the compound (II). The reaction is usually carried out at about 80° to 250°C, and in most cases it is completed in 1 minute to 24 hours. The reaction may be conducted either at the atmospheric pressure or under an elevated pressure. It is to be noted that the same object can be realized by the application of per se known reduction, for example, a conventional hydrogenation in the presence of a catalyst such as palladium platinum or nickel.

Step (3) i.e. Means (B) is performed by subjecting the decahydrocinnoline of the formula (IV) to a ring-closure with formaldehyde or its derivative to give the corresponding 9-azamorphinan (I). As the derivative of formaldehyde there are employed, salts of hydroxymethane-sulfonic acid, paraformaldehyde etc. This reaction is generally carried out in the presence of an acid catalyst, and usually in a solvent. For this purpose, any of the solvents which are not involved in the reaction may be used, and they are exemplified by water, methanol, ethanol, propanol and the like. The reaction time is about 1 to 10 hours, and the reaction temperature is generally chosen from about 20° to 100°C with satisfactory results.

In Step (4) i.e. Means (A), 3-hydroxy-9-azamorphinan is reacted with a compound represented by RX (wherein R has the same meaning as mentioned above and X stands for an acid residue) to give N-substituted 9-azamorphinan (I). This reaction is usually carried out in a solvent, but it can also proceed without solvent. When a solvent is used, it may be any of solvents so far as it is inert to the reaction, and may be exemplified by methanol, ethanol, benzene, toluene, acetone, chloroform, etc. The acid residue represented by X include, for example, Br-, Cl-, I-, HSO$_3$-, ClO$_4$-, OH-, CH$_3$

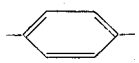

SO$_3$-, etc. The reaction temperature is about 20° to 200°C. The reaction time cannot be prescribed, but usually falls within the range from 1 to 20 hours with satisfactory results. This reaction may be effected in the presence of an inorganic base such as potassium carbonate, sodium carbonate, sodium hydrogencarbonate, or the like as the catalyst.

After the reaction of the Step (1), (2), (3) or (4), the product of said reaction can be recovered by conventional means (e.g. alteration of the acidity, transfer extraction, concentration, crystallization, recrystallization or chromatography). The compounds thus produced contain a basic amino group in their structure, and are all capable of forming acid addition salts with various organic acid or inorganic acid as well as quarternary ammonium salts. For example, such mineral acids as hydrochloric acid, hydrobromic acid, such organic acids as oxalic acid, fumaric acid, maleic acid, succinic acid, malonic acid, acetic acid, propionic acid and benzenesulfonic acid or such alkyl halides as methyl iodide, can be reacted with them according to conventional means to produce the corresponding salts.

Moreover, containing both the basic amino groups and a phenolic group, the 3-hydroxy-9-azamorphinans thus produced according to this invention demonstrate an amphoteric nature. Therefore, it should be noted that acid salts, quaternary ammonium salts and alkali salts (e.g., potassium salt, sodium salt, etc.) of azamorphinan compounds (I) should be included in the scope of the present invention.

In this connection, the processes for the preparation of the starting materials is mentioned according to the above described reaction schema.

Firstly, in Step (5), the carboxylic acid or its ester or halide, represented by the general formula (VI), is allowed to react with hydrazine or a substituted hydrazine to produce a ketocinnoline (VII). This reaction is usually carried out in a solvent, but it can be conducted without solvent. Any solvent can be used so far as it is not involved in the reaction, and it is exemplified by water, methanol, ethanol, benzene, toluene, etc. The substituted hydrazines may be methylhydrazine, benzylhydrazine, phenethylhydrazine, phenylhydrazine, etc. The reaction temperature is usually chosen from about 20° to 150°C. The reaction time is difficult to be prescribed, but it is usually sufficient to conduct the reaction for about 1 to 20 hours. As for the recovery of the reaction product, there may be adopted any of per se known means (e.g. alteration of the acidity, transfer extraction, concentration, distillation and chromatography).

Step (6) is to reduce a ketocinnoline (VII) with a reducing agent. The means for the reduction and recovery in this Step are similar to those in Step (1).

In the Step (7), decahydrocinnoline compound (IV) is prepared by subjecting the compound (XI) to an elimination reaction to remove the residue R$_1$ of the compound (XI). The procedures are similar to those required in Step (2).

The Step (8) is performed by cyclizing a Decahydrocinnoline compound (XI) to produce the corresponding 3-oxygenated-9-azamorphinan (III). The means for the reaction and recovery are similar to those in the Step (3).

Step (9) is the step where a ketocinnoline represented by the general formula (VII) is reduced with a reducing agent to give the corresponding 3-keto-decahydrocinnoline (VIII). In this reaction there can be conveniently employed any of conventional reducing means. A particularly preferable means is the catalytic reduction in the presence of platinum oxide, but it is also recommended to use sodium borohydride or to employ the catalytic reduction with a catalyst such as palladium, platinum or nickel. This reaction is usually conducted in a suitable solvent, and for this purpose there may conveniently be employed lower alcohols such as methanol, ethanol or propanol, their mixture with water, acetic acid and the like. The reaction is carried out in the neighborhood of ambient temperature or under suitable heating. After the reaction, the object compound, i.e. the 3-ketodecahydrocinnoline of the general formula (VIII) can be recovered by per se known means (e.g. alteration of the acidity, transfer extraction, recrystallization, chromatography and distillation). As the compound represented by the general formula (VIII) is basically a free base, it is possible to convert the base into the corresponding salts according to per se known means when desired.

Step (10) is the step where the 3-ketodecahydrocinnoline (VIII) is subjected to a ring-closure with the aid of a cyclizing agent to give the corresponding ketoazamorphinan derivative (IX). The means for the ring-closure and the recovery of the product in this reaction are similar to those in Step (3).

Step (11) is the reduction of a ketoazamorphinan represented by the general formula (XIII) with a reducing agent to produce the corresponding 3-oxygenated-9-azamorphinan (X). The means for the reduction and recovery in this reaction are similar to those in Step (6).

In Step (12), the N-acyl-9-azamorphinan (XII) are obtained from the 3-oxygenated-9-azamorphinan (X) by reacting the compound (X) with an acylating agent such as various carboxylic acid halide (as the halide, e.g. chloride, bromide, iodide or fluoride) or acid anhydrides, if desired, in the presence of an organic base. As the base for this purpose, it is preferable to use a tertiary amine such as pyridine, triethylamine or triethanolamine. Any solvents can be used for this reaction unless they are not involved in the reaction, and examples are ether, benzene, toluene, chloroform or xylene. The reaction time is about 0.5 to 10 hours, and the reaction temperature is, in most cases, enough to be about 0° to 100°C. When a carboxylic acid halide is used in this reaction, the use of an inorganic base such as sodium hydroxide or potassium hydroxide will give good results.

The Step (13) is to produce the 3-oxygenated-9-azamorphinans (III) from N-acyl-9-azamorphinans (XII) through a reduction reaction. The procedures required are similar to those in Step 1.

Step (14) is the step where a compound of the general formula (III) having a benzyl as R is subjected to reductive debenzylation to give (X) from (III). Any of per se known reduction means can conveniently be employed for this reaction. Particularly preferable is the catalytic reduction in the presence of palladium carbon. Alternatively, other metallic catalysts such as platinum, nickel are also used for the catalytic reduction. As (III) are basically free bases, their salts can also be used for the starting material for said reduction with the same result. Said reaction is usually carried out in a suitable solvent, which is exemplified by lower alcohol such as methanol, ethanol, propanol or the like, their mixture with water and acetic acid. The reaction is effected in the neighborhood of ambient temperature or under suitable warming.

The Step (15) is a step of reacting the compound (X) with the above mentioned compound of the general formula (V). The procedures are the same as those in Step (4).

The Step (16) is to prepare 3-oxygenated-9-azamorphinans (III) from a compound (IX) through a reduction reaction. The means required are similar those in Step (6).

In the Step (17), N,O-diacyl-9-azamorphinans (II) are obtained from 3-hydroxy-9-azamorphinan with an acylating agent. The means therefor are similar to those required in Step (12). The N-monoacyl-9-azamorphinan compounds, i.e. the compound (II) in which $R_3$ is hydrogen, is obtained by hydrolyzing the N,O-diacyl-9-azamorphinan (II) with a mineral acid or an alkali.

For this, hydroiodic acid, hydrobromic acid, hydrochloric acid or phosphoric acid, for example, is used as the mineral acid, and sodium hydroxide or potassium hydroxide, for instance, is used as the alkali. The concentration of the mineral acid or the alkali is about 1 to 20 percent. The reaction temperature is 20° to 100°C, and the reaction time is, in most cases, enough to be about 0.5 to 10 hours. Any solvents can be used so far as they are not involved in the reaction, but, in general, water gives a favorable result.

The N-monoacyl-9-azamorphinan compounds may be prepared by mono-acylating 3-hydroxy-9-azamorphinan by per se known means, for example by reacting 3-hydroxy-9-azamorphinan with equimolar said acylating agent at relatively low temperature.

As is explained above, the compounds obtained according to the method of this invention are novel and they, as well as the inorganic or organic salts thereof, exhibit prominent medicinal effects, for example, analgesic or sedative activity. Moreover, they give no or little physical dependence to the host. Thus, they are quite useful as pharmaceuticals.

For example, the following are some of the pharmacological test results on a typical compound of the general formula (I), i.e. 3-hydroxy-N-phenethyl-9-azamorphinan hydrobromide (referred to as Compound A), in comparison with morphine hydrochloride or pethidine hydrochloride.

Acute Toxicity:

$LD_{50}$ values of the test compounds in mice when administered intraperitoneally are as follows:

Compound A — 713 mg/kg
Morphine-HCl — 437 mg/kg

Analgesic Activities:

a. Test compounds were subjected to D'Amour & Smith Test after the manner described in Journal of Pharmacology and Experimental Therapeutics, Vol. 72, p 74 (1941), employing mice, and the respective $ED_{50}$ values (mean effective doses) were calculated:

Compound A — 2.4 mg/kg
Morphine-HCl — 1.4 mg/kg
Pethidine-HCl — 19.5 mg/kg b. Inhibition of the test compounds when administered subcutaneously on writhing syndrome induced by phenylquinone was observed after the manner described in British Journal of Pharmacology and Chemotherapy, Vol.1, p.4 (1946), employing 10 mice per group, each weighing 20±2 grams, and the result is shown in the following table.

| Test Compound | Dose (mg/kg) | Mean Contractions | Inhibition (%) |
|---|---|---|---|
| Control | 0 | 17.8±2.4 | 0 |
| Compound A | 0.5 | 12.2±2.8 | 31.5 |
|  | 1.0 | 3.9±1.8 | 79.0 |
| Morphine-HCl | 0.5 | 18.3±3.0 | 0 |
|  | 1.0 | 3.2±0.8 | 82.0 |
| Pethidine-HCl | 4.0 | 13.8±2.8 | 11.5 |
|  | 8.0 | 2.4±0.7 | 86.5 |

The azamorphinan compounds (I) of the present invention can be safely employed as analgesics, by themselves or in the form of a pharmaceutically acceptable composition by admixture with a suitable and conventional carrier or adjuvant, administrable orally or by way of injection, without giving harm to the host. The pharmaceutical composition can take the form of tablets, granules, powders, capsules or injections and can be administered orally or subcutaneously or intramuscularly.

When said azamorphinans are administered through injection, usual daily doses lies in the range of about 0.1 to about 100, preferably about 10 to 50 milligrams per human adult. In case of oral administration, the compound is employed in the range of about 0.5 to about 100 milligrams, more preferably about 20 to about 100 milligrams, per human adult.

For further explanation of the present invention, the following examples are given, wherein the words "milligram(s)" and "milliliter(s)" are abbreviated simply as "g." and "ml." respectively.

EXAMPLE 1

A suspension of 10g. of lithium aluminum hydride in 300 ml. of anhydrous dioxane is refluxed with stirring, while a solution of 4.6g. of N-phenacetyl-3-phenacetyloxy-9-azamorphinan in 200 ml. of dioxane is added thereto dropwise. The whole mixture is further refluxed for 6 hours and allowed to cool. An excess of the lithium aluminum hydride is decomposed under ice-cooling with a 10 percent sodium hydroxide solution. The dioxane layer is decanted and dried over potassium carbonate, followed by introduction of hydrogen bromide. The dioxane is distilled off to obtain 1.5g. 3-hydroxy-N-phenethyl-9-azamorphinan hydrobromide as colorless needles melting at 243° to 244°C (decomposition).

Infrared absorption spectrum: $\nu_{max}^{KBr}$ cm$^{-1}$: 3280 (hydroxyl), 2,800–2,400 (salt absorption), 742, 700 (aromatic ring)
Elementary analysis: $C_{23}H_{28}ON_2 \cdot HBr$
Calculated: C, 64.53; H, 6.81; N, 6.52
Found: C, 64.39; H, 6.72; N, 6.40

EXAMPLE 2

A suspension of 10g. of lithium aluminum hydride in 300 ml. of anhydrous dioxane is refluxed with stirring, and is added thereto dropwise a solution of 5g. of N-benzoyl-3-benzoyloxy-9-azamorphinan in 200 ml. of dioxane. The whole mixture is further refluxed for 6 hours. After cooling, an excess of the lithium aluminum hydride is decomposed under ice-cooling with a 10 percent sodium hydroxide. The dioxane layer is decanted and dried over potassium carbonate, followed by introduction of hydrogen chloride thereto. The dioxane is distilled off to leave an oily substance, which is crystallized in a mixture of isopropanol and ether and further recrystallized from the same solvent to obtain 2.1g. of N-benzyl-3-hydroxy-9-azamorphinan hydrochloride as colorless needles melting at 245°C.

Infrared absorption spectrum: $\nu_{max}^{KBr}$ cm$^{-1}$: 3,200 (hydroxyl), 2,800 to 2,200 (absorption by a salt), 738, 770 (aromatic ring)
Elementary analysis: $C_{22}H_{26}ON_2 \cdot HCl$
Calculated: C, 71.23; H, 7.43; N, 7.55
Found: C, 70.90; H, 7.60; N, 7.44

In a similar manner, N-cyclopropylmethyl-3-hydroxy-9-azamorphinan hydrochloride and N-allyl-3-hydroxy-9-azamorphinan are also obtained from 3-benzoyloxy-N-cyclopropylmethyl-9-azamorphinan and N-allyl-3-benzoyloxy-9-azamorphina, respectively.

EXAMPLE 3

To a solution of 2.1g. of 3-methoxy-N-phenethyl-9-azamorphinan hydrochloride in 200 ml. of acetic acid, there is added 25g. of a 48 percent hydrobromic acid, and the whole is heated in an oil bath under reflux for 1 hour. On concentration of the mixture, crystals separate and are recrystallized to give 0.8g. (35.4 percent) of 3-hydroxy-N-phenethyl-9-azamorphinan hydrobromide as colorless needles melting at 233° to 234°C (decomposition).

In a similar manner, N-benzyl-3-hydroxy-9-azamorphinan hydrobromide, N-cyclopropylmethyl-3-hydroxy-9-azamorphinan hydrobromide and N-allyl-3-hydroxy-9-azamorphinane hydrobromide are also produced from N-benzyl-3-methoxy-9-azamorphinan, N-cyclopropylmethyl-3-methoxy-9-azamorphinan and N-allyl-3-methoxy-9-azamorhpinan, respectively.

EXAMPLE 4

A solution is made from 1.3g. of 3-benzyloxy-N-phenethyl-9-azamorphinan, 40 ml. of concentrated hydrochloric acid and 20 ml. of ethanol. The solution is refluxed for 4 hours under heating. After reaction, water and ethanol are evaporated off to obtain crude crystals. Thus obtained crystals are recrystallized from isopropanol to obtain 0.8g. of 3-hydroxy-N-phenethyl-9-azamorphinan hydrochloride as colorless prisms melting at 239° to 241°C (decomposition). The yield is 75 percent.

Infrared absorption spectrum: $\nu_{max}^{KBr}$ cm$^{-1}$: 3,200(OH)
Elementary analysis: $C_{23}H_{28}ON_2 \cdot HCl$
Calculated: C, 71.76; H, 7.59; N, 7.28
Found: C, 71.55; H, 7.48; N, 7.33

In a similar manner, N-benzyl-3-hydroxy-9-azamorphinan hydrochloride is also produced from N-benzyl-3-benzyloxy-9-azamorphinan.

EXAMPLE 5

A solution is made from 3.0g. of 2-phenethyl-4a-(3-hydroxyphenyl)decahydrocinnoline, 4.0ml. of concentrated hydrochloric acid, 30 ml. of ethanol, 20 ml. of water and 20 ml. of an aqueous 37 percent formaldehyde solution. The solution is refluxed for 2 hours on a water bath. After reaction, ethanol is evaporated off, the remaining mixture being adjusted to be alkaline with 28 percent aqueous ammonia, and the resulting mixture is extracted with chloroform. The chloroform layer is washed with water, dried over magnesium sulfate, and concentrated. The residue is crystallized by the addition of ether. The crystals are recrystallized from ethanol to obtain 2.5g. of 3-hydroxy-N-phenethyl-9-azamorphinan as colorless prisms melting at 178° to 180°C. The yeild is 80.3 percent.

Infrared absorption spectrum: $\nu_{max}^{KBr}$ cm$^{-1}$: 3,480(OH)
Elementary Analysis: $C_{23}H_{28}ON_2$
Calculated: C, 79.27; H, 8.10; N, 8.04
Found: C, 79.55; H, 8.32; N, 7.93

By similar procedures, the following compounds are obtained. N-benzyl-3-hydroxy-9-azamorphinan, N- cyclopropylmethyl-3-hydroxy-9azamorphinan and N-allyl-3-hydroxy-9-azamorphinan are also produced from 2-benzyl-4a-(3-hydroxyphenyl)decahydrocinnoline, 2-cyclopropylmethyl-4a-(3-hydroxyphenyl)decahydrocinnoline, 2-allyl-4a-(3-hydroxyphenyl)decahydrocinnoline, respectively.

EXAMPLE 6

4.8g. of 3-benzyloxy-N-phenethyl-9-azamorphinan hydrochloride is dissolved into 100ml. of ethanol. To the solution is added 1g. of 10 percent palladium-carbon. The catalytic reduction is effected in a current of hydrogen gas at a room temperature under atmoshperic pressure until 240 ml. of hydrogen gas is absorbed. The reaction mixture is filtered to remove the catalyst, and ammonia gas is passed through the filtrate. The solvent is evaporated off, and the residue is recyrstallized from ethanol to obtain 2.18g. of 3-hydroxy-N-phenethyl-9-azamorphinan as colorless prisms melting at 178° to 180°C. The chemical structure of this compound is confirmed by infrared absorption spectrum, and no depression of the melting point is observed when mixed with the compound in Example 5.

By similar procedures N-cyclopropylmethyl-3-hydroxy-9-azamorphinan and N-allyl-3-hydroxy-9-azamorphinan are also prepared from N-cyclopropylcarbonyl-3-hydroxy-9-azamorphinan and N-acryloyl-3-hydroxy-9-azamorphinan, respectively.

A mixture of 1g. of 3-hydroxy-N-phenethyl-9-azamorphinan, 10 ml. of methyl iodide and 100 ml. of methanol is refluxed for 3 hours. After the reaction, the reaction mixture is concentrated to obtain crude crystals. The crystals are recrystallized from ethanol to obtain 0.8g. of 3-hydroxy-N-methyl-N-phenethyl-9-azamorphinium iodide as colorless powder melting at 187° to 188°C (decomposition).

EXAMPLE 7

A soluction of 1.8g. of phenethyl bromide and 1.3g. of sodium bicarbonate in 100 ml. of dimethylformamide is added to 2.5g. of 3-hydroxy-9-azamorphinan, and the mixture is refluxed for 5 hours under heating. After the reaction, the reaction mixture is filtered and the filtrate is concentrated under reduced pressure. The residue is crystallized by the addition of ether, and thus obtained crude crystals are recrystallized from ethanol to obtain 2.8g. of 3-hydroxy-N-phenethyl-9-azamorphinan as cololess prisms melting at 178° to 180°C. The chemical structure of this compound is confirmed by infrared absorption spectrum and no depression of the melting point is observed when mixed with the compound in Example 6.

In a similar manner, N-benzyl-3-hydroxy-9-azamorphinan, N-cyclopropylmethyl-3-hydroxy-9-azamorphinan and N-allyl-3-hydroxy-9-azamorphinan are also obtained from benzyl bromide, cyclopropyl bromide and allyl bromide, respectively.

EXAMPLE 8

2g. of lithium aluminum hydride is suspended in 20 ml. of anhydrous dioxane. To the suspension is dropwise added 3.5g. of N-benzoyl-3-hydroxy-9-azamorphinan in 50 ml. of anhydrous dioxane. The mixture is refluxed for 5 hours under stirring. After cooling, the excess of lithium aluminum hydride is decomposed with a small amount of water, and the dioxane layer is separated by decantation. The remaining solid material is dissolved into an aqueous hydrochloric acid. The aqueous solution is changed to be alkaline with aqueous ammonia, and the mixture is extracted with chloroform. The chloroform layer is combined with said dioxane layer, and is dried with anhydrous sodium sulfate. The resulting solution is concentrated, and the residue is recrystallized from benzene-hexane to obtain 2.0g. of N-benzyl-3-hydroxy-9-azamorphinan as colorless prisms melting at 124°C.

Elementary analysis : $C_{22}H_{26}ON_2$
Calculated : C, 79.00; H, 7.84; N, 8.78
Found: C, 78.85; H, 7.86; N, 8.79

In a similar manner N-phenethyl-3-hydroxy-9-azamorphinan is also produced from N-pheacetyl-3-hydroxy-9-azamorphinan.

EXAMPLE 9

A mixture of 3g. of 3-hydroxy-9-azamorphinan, 2g. of allyl bromide, 3g. of sodium bicarbonate and 50 ml. of dimethylformamide is heated under stirring at 120° to 130°C for 3 hours. After the reaction, the solvent and an excess of the allyl bromide are removed by evaporation, and the residue is extracted with chloroform. The chloroform layer is washed with water, dried with anhydrous sodium sulfate, and concentrated to obtain red-brown oil. The oil solidifies upon the addition of a mixed solvent of ether and n-hexane to obtain 3-hydroxy-N-allyl-9-azamorphinan as pale yellow powder. The powder is recrystallized from ether to give 1.85g. of colorless powder melting at 141° to 142°C (decomposition). The yield is 85 percent.

Elementary analysis : $C_{18}H_{24}ON_2$
Calculated : C, 76.02; H, 8.51; N, 9.85
Found: C, 76.28; H, 8.45; N, 10.03
Infrared absorption spectrum : $\nu_{max}^{KBr}$ cm$^{-1}$; 3,400(OH), 1,650 (C=C).

EXAMPLE 10

2.4g. of 3-acryloyloxy-N-acryloyl-9-azamorphinan is dissolved into 300 ml. of ether. To the solution is dropwise added, under stirring, a suspension prepared from 2.4g. of lithium aluminum hydride and 100ml. of ether. The mixture is heated under reflux for 3 hours. After the reaction, an excess of the lithium aluminum hydride is decomposed by the addition of a small amount of water under cooling with ice water. To the mixture is added ammonium chloride, and the whole mixture is stirred vigorously. The ether layer is separated from the aqueous layer, washed with water, and dried over anhydrous sodium sulfate. The solvent is evaporated off, and the residue is crystallized from ether to obtain 1.2g. of N-allyl-3-hydroxy-9-azamorphinan as colorless powder melting at 140° to 142°C. The yield is 62 percent. The product is in good accordance with the compound prepared by the method of Example 9 in respect of the infrared spectrum.

EXAMPLE 11

A mixture of 3.0g. of 3-hydroxy-9-azamorphinan, 2.0g. of 3,3-dimethylallyl bromide, 1g. of sodium bicarbonate and 50 ml. of dimethylformamide is heated at 150° to 155°C under stirring for 4 hours. After the reaction, the solvent and an excess of the 3,3-dimethylallyl bromide are evaporated off. To the residue is added water, and the mixture is extracted with chloroform. The chloroform layer is dried over sodium sulfate, and the solvent is evaporated off to leave red-brown precipitate, which is crystallized from ether to obtain 2.16g. of N-(3,3-dimethylallyl)-3-hydroxy-9-azamorphinan as pale yellow powder melting at 183° to 185°C. The yield is 68.3 percent.

Elementary analysis : $C_{20}H_{28}ON_2$
Calculated : C, 76.88; H, 9.03; N, 8.97
Found: C, 76.80; H, 8.96; N, 8.99
Infrared absorption spectrum : $\nu_{max}^{KBr}$ cm$^{-1}$; 3,400(OH),
1,600(C=C).

EXAMPLE 12

1.5g. of 3-(3,3-dimethylacryloyloxy)-N-(3,3-dimethylacryloyl)-9-azamorphinan is dissolved into 200 ml. of ether, there is dropwise added under stirring a suspension prepared from 2g. of lithium aluminum hydride and 100ml. of ether. The reaction mixture is heated under reflux for 5 hours. After cooling, an excess of the lithium aluminum hydride is decomposed by a small amount of water under cooling with ice water. Ammonium chloride is added thereto, and the whole mixture is stirred vigorously. The ether layer is separated from the aqueous layer, washed with water, and dried over anhydrous sodium sulfate. The solvent is evaporated off, and the residue is recrystallized from ether to obtain 0.8g. of N-(3,3-Dimethylallyl) -3-hydroxy-9-azamorphinan as colorless powder melting at 183° to 185°C. The yield is 69.2 percent. The chemical structure of this compound is confirmed by the infrared absorption spectrum and the mixed examination with the compound in Example 11.

What is claimed is:

1. A member selected from the group consisting of an azamorphinan compound of the formula

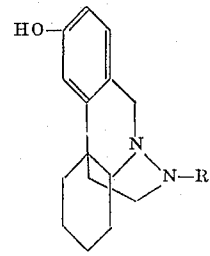

wherein R is benzyl, phenethyl, phenylpropyl, lower alkenyl or cycloalkylalkyl of four to eight carbon atoms, and pharmaceutically acceptable salts thereof.

2. The compound as in claim 1, in the form of a pharaceutically acceptable salt.

3. The compound as in claim 1 wherein R is phenethyl.

4. The compound as in claim 1 wherein R is benzyl.

5. The compound as in claim 1 wherein R is cyclopropylmethyl.

6. The compound as in claim 1 wherein R is allyl.

7. The compound as in claim 1 wherein R is 3,3-dimethylallyl.

8. The compound as in claim 1 wherein R is benzyl, phenethyl, 3-phenylpropyl, lower alkenyl or cycloalkylalkyl of four to eight carbon atoms, or a pharmaceutically acceptable salt of said compound.

* * * * *